Nov. 5, 1968  A. L. SIMMONS ET AL  3,408,872

CIRCUMFERENTIAL FLEXURE VIBRATING GYROSCOPE

Filed Oct. 14, 1965

INVENTORS.
ARTHUR L. SIMMONS,
JOHN J. BUCKLEY
BY Harry A. Herbert Jr.
ATTORNEY

Henry S. Miller Jr.
AGENT

United States Patent Office 3,408,872
Patented Nov. 5, 1968

3,408,872
CIRCUMFERENTIAL FLEXURE VIBRATING
GYROSCOPE
Arthur L. Simmons, Annapolis, and John J. Buckley, Baltimore, Md., assignors, by mesne assignments, to the United States of America as represented by the Secretary of the Air Force
Filed Oct. 14, 1965, Ser. No. 496,196
4 Claims. (Cl. 73—505)

ABSTRACT OF THE DISCLOSURE

A vibrating gyroscope including a cylinder of piezoelectric, ferromagnetic or magnetostrictive material, with masses attached symmetrically about the ends thereof and a voltage for longitudinally polarizing and driving the cylinder in the circumferential mode. The cylinder is rotatably mounted at the midpoint of its longitudinal axis so that as a force is applied the cylinder moves about its mounting point and a signal is produced indicative of such movement.

---

This invention relates generally to gyroscopic devices, and more particularly to vibrating gyroscopic devices which utilize the circumferential flexural mode of a cylinder as a means for generating cyclical changes in the moments of inertia of the cylinder ends.

In the past, rate of turn has generally been measured by rotating mass type gyroscopes. Such devices may prove satisfactory where they can be serviced periodically and their reliability is not critical as, for example, in the stabilization system of aircraft. Heretofore, a source of power for such gyros has been of negligible importance since all aircraft and vehicles utilizing gyros have an adequate supply of electrical current. On the other hand, however, in systems where the gyroscope may not be serviced and its operation is extremely critical for extended periods of time, and further where power supplies are limited, the rotating mass gyroscope has shown itself to be inadequate for the task.

Conversely, a vibrating gyroscope has certain inherent advantages over its rotating mass counterpart, the most fundamental of these lie in the substitution of a single sensor which acts as a combination self-driven mass, displacement and velocity restraint and output signal generator. The employment of the circumferential flexural mode as the drive mode, which is the particular feature of this invention, further enhances the instrument's advantages.

The vibrating gyroscope is especially useful in the field of space technology where satellite systems are required to operate for long periods of time without servicing of any type. Some of the particular features of this gyro is that it has no bearings and hence no lubrication problems; no moving parts and hence no deterioration in performance caused by wear; low power requirements; long life; it is small in size and has high reliability since the number of modes of failure are greatly reduced and operates in a hard vacuum and, consequently, ideally suited for space applications. In addition to the aforementioned advantages over rotating gyroscopes, this invention driven in the circumferential flexural mode, has the advantage over more conventional vibrating gyroscopes in that the circumferential flexural mode can be more positively defined than the push-pull radial mode, and further since the resonant frequency of the circumferential flexural mode is lower than the push-pull radial mode, for a given configuration, the ration of length to diameter is more amenable to sub-miniaturization than a cylinder employing the push-pull radial mode.

It is therefore an object of this invention to provide a new and improved type of gyroscope.

It is another object of this invention to provide a new and improved type of vibrating gyroscope.

It is a further object of this invention to provide a gyroscopic device capable of operating for long periods without servicing.

It is still another object of this invention to provide a gyroscopic device which operates in the circumferential flexural mode.

It is still a further object of this invention to provide a gyroscopic device which may be of either piezoelectric or magnetostrictive material or a combination of both materials.

It is another object of this invention to provide a gyroscope which has small size and low requirements.

These and other advantages, features and objects to the invention will become more apparent from the following description taken in connection with the illustrative embodiments in the accompanying drawings, wherein.

Figure 1:
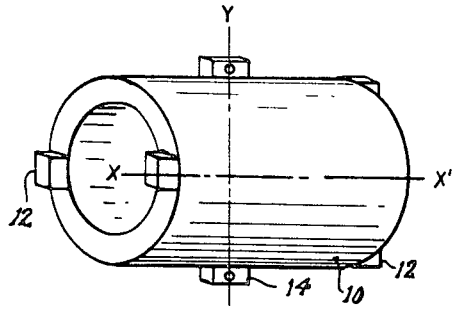
FIG. 1 is a side elevation view of one embodiment of this invention with masses attached.

Referring now to FIG. 1, there is a cylinder 10 which is driven along its entire length in the circumferential mode. Cyclical changes in the moments of inertia of the ends are created by attaching the masses 12. The masses are attached symmetrically about the cylinder axis on either end or on mutually perpendicular diametrical lines. Thus, when one set of masses is in the extreme outward position, the other set is in the extreme inward position and, as a consequence, the moments of inertia of the ends of the cylinder will vary cyclically, the moment of inertia of one end increasing as the other decreases and four equally spaced modes are created along the length of the cylinder. When the cylinder is rotated about its longitudinal axis (X—X'), the ends rotate cyclically in opposite directions as required by the law of conservation of angular momentum. This torsional motion creates a circumferential mode at the mid-portion of the cylinder. The cylinder is mounted at the intersection of the longitudinal and circumferential nodal lines by means of tabs 14.

Figure 2:
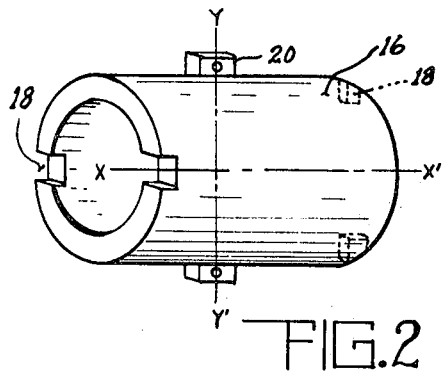
FIG. 2 is a side elevation view of another embodiment of this invention with masses removed.

An alternate method to that of FIG. 1 is that shown by FIG. 2 wherein masses are removed from the ends of the cylinder 16 in the form of slots 18, mounting is accomplished by tabs 20. The principle of operation of FIG. 2 is the same as that for FIG. 1.

Figure 3:
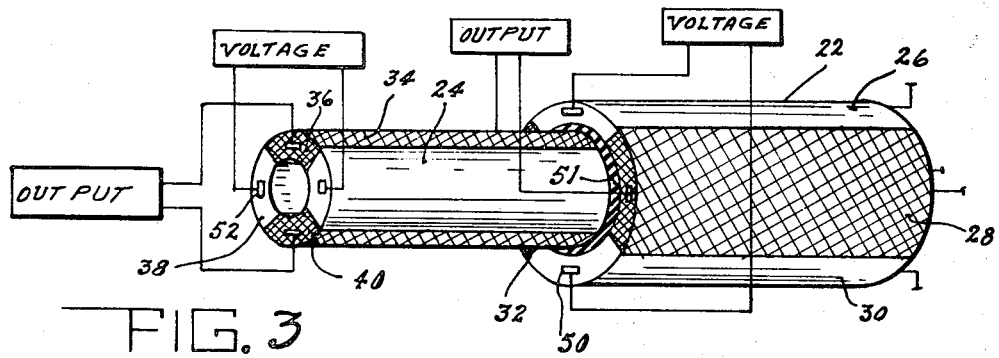
FIG. 3 is another embodiment of this invention utilizing concentric cylinders.
Figure 4:
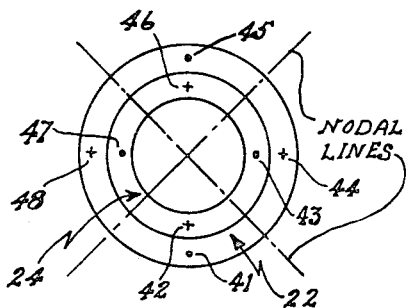
FIG. 4 is a schematic view of the end of the cylinders of FIG. 3.

In order to drive the cylinder in the circumferential flexural mode, several means may be used. In one manner the cylindrical transducer is formed from two concentric piezoelectric cylinders 22 and 24, as seen in FIG. 3. Each cylinder is polarized longitudinally in four equal circumferential segments 26 and 40 with the direction of polarization of each adjacent segment in the opposite direction. FIG. 4 illustrates the polarization direction with the even numbers 42, 44, 46 and 48 polarized into the page and the odd numbers 41, 43, 45 and 47 polarized out of the page. The cylinders are assembled concentrically such that juxtaposed segments have their directions of polarization in opposition. The diametrically opposite segments of each cylinder are polarized in two different stages and the final assembly in essentially a cylindrical bimorph.

In order to create circumferential flexural vibrations, driving electrodes 50 and 52 are plated on diametrically equal circumferential segments on each end of the assembled cylinder. The contacting surfaces of the cylinder are insulated from each other by insulating material 51 to prevent the electric fields from canceling each other. When an alternating voltage is applied to these electrodes, the diametrically opposite segments will undergo flexure in the same manner as a bimorph. When the device is subject to an input angular velocity, the coupling of the Coriolis forces from the circumferential mode will torque the cylinder in the torsional mode. The torsional shearing stresses in conjunction with the longitudinal polarization will result in an electric field in a circumferential direction. The direction of the generated field will be in opposite directions for each cylinder. Thus, one pair of diametrically opposite segments of assembled cylinder is used to drive the cylinder circumferentially in flexure and the other pair is utilized to extract the rate of intelligence.

For maximum performance of the instrument, the two resonant modes are adjusted until their resonant frequencies coincide. The output intelligence will be an amplitude modulated signal with a frequency equal to the resonant frequency of the instrument and a phase and magnitude that are proportional to the direction and magnitude respectively of the input angular velocity.

Figure 5:
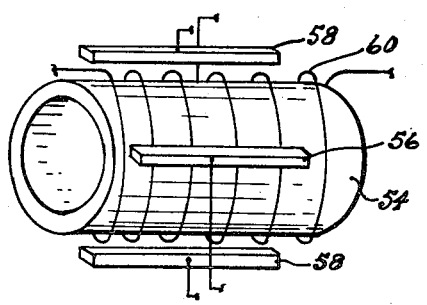
FIG. 5 is a schematic view of another embodiment of this invention.

An alternate scheme is shown in FIG. 5 where a single cylinder 54 of some magnetostrictive material is used. The cylinder may be driven in the circumferential flexural mode by magnets 56 and 58 positioned in diametrically opposite pairs. The cylinder may be permanently magnetized longitudinally similar to the polarization of the piezoelectric cylinder for the purpose of obtaining an output signal. When the cylinder vibrates in the torsional mode, an alternating flux will be generated that can be detected by the coil 60 that encircles the cylinder.

Figure 6:
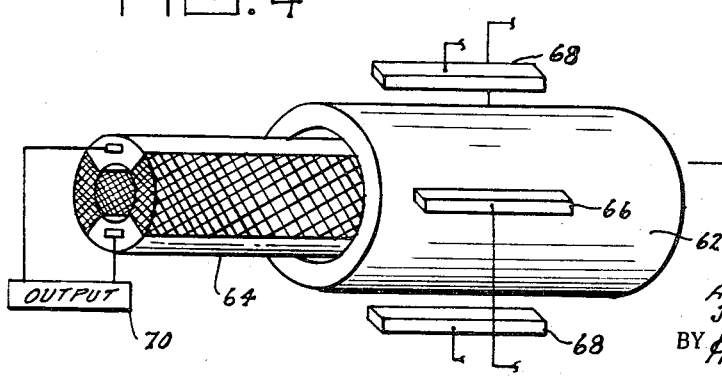
FIG. 6 is a side elevation view of an alternate embodiment of this invention.

With regard to FIG. 6, a composite sensor comprised of a outside ferromagnetic cylinder 62 and an inside piezoelectric cylinder 64 is possible. Such a composite cylinder can be driven in the circumferential flexural mode with the magents 66 and 68 while the output signal is extracted from the electrodes 70 of the inside piezoelectric cylinder in the same manner as the all piezoelectric configuration of FIG. 3.

Although the invention has been described with reference to particular embodiments, it will be understood to those skilled in the art that the invention is capable of a variety of alternative embodiments within the spirit and scope of the appended claims.

We claim:

1. A vibrating gyroscope comprising: a cylindrically-shaped body, including a pair of concentric piezoelectric cylinders having insulating means therebetween and masses disposed at each end symmetrically about the longitudinal axis, and along mutually perpendicular diametrical axis of the driven circumferential mode; means for driving the cylinder along its entire length in the circumferential mode, including voltage means for polarizing each of said pair of cylinders, longitudinally in four equal circumferential segments whereby juxtaposed segments of each of said pair of cylinders has its polarization in opposition; means for rotatably mounting the cylindrically-shaped body at the midpoint of its longitudinal axis; and electrode means mounted on said cylinders for extracting an output signal therefrom upon movement in the torsional mode.

2. A vibrating gyroscope comprising: a cylindrically-shaped body, including a pair of concentric piezoelectric cylinders having insulating means therebetween and notches at each end symmetrically about the longitudinal axis and along mutually perpendicular diametrical axis of the driven circumferential mode; means for driving the cylinder along its entire length in the circumferential mode, including voltage means for polarizing each of said pair of cylinders longitudinally in four equal circumferential segments whereby juxtaposed segments of each of said pair of cylinders has its polarization in opposition; means for movably mounting the cylindrically-shaped body at the midpoint of its longitudinal axis; and electrode means on said cylinders for extracting an output signal therefrom upon movement in the torsional mode.

3. A vibrating gyroscope comprising a cylindrically-shaped body, including a pair of concentric cylinders, one of said cylinders formed of ferromagnetic material while the other of said cylinders is formed of piezoelectric material, masses disposed at each end symmetrically about the longitudinal axis of said body and along mutually perpendicular diametrical axis of the driven circumferential mode; means for driving the piezoelectric cylinder along its entire length in the circumferential mode including voltage means for polarizing each of four circumferential segments in the opposite direction, and magnets positioned in diametrically opposed pairs around said ferromagnetic cylinder for driving a cylinder in the circumferential mode, whereby juxtaposed segments of each of said pair of cylinders has its polarization in opposition; means for mounting the cylindrically-shaped body at the midpoint of its longitudinal axis; and electrical means for indicating the movement of the cylindrically-shaped body about the mounting point.

4. A vibrating gyroscope comprising: a cylindrically-shaped body of a permanently magnetized magnetostrictive material having masses disposed at each end, symmetrically about the longitudinal axis and along mutually perpendicular diametrical axis of the driven circumferential mode; means for driving a cylinder in the circumferential mode including magnets positioned in diametrically opposed pairs about said cylinder; voltage means for magnetizing said magnets; means for mounting the cylindrically-shaped body at the midpoint of its longitudinal axis; and a coil means encircling the cylinder for extracting an output signal indicative of movement when the cylinder vibrates in the torsional mode.

References Cited

UNITED STATES PATENTS 3,182,512   5/1965   Jones et al. _____ 73—505
3,307,409   3/1967   Newton _____ 73—505

JAMES J. GILL, *Primary Examiner.*